US008982754B2

(12) United States Patent
Filoso et al.

(10) Patent No.: US 8,982,754 B2
(45) Date of Patent: Mar. 17, 2015

(54) I/O DRIVEN NODE COMMISSIONING IN A SLEEPING MESH NETWORK

(75) Inventors: John P. Filoso, Pleasant Grove, UT (US); Jay Douglas George, Orem, UT (US)

(73) Assignee: Digi International Inc., Minnetonka, MN (US)

( * ) Notice: Subject to any disclaimer, the term of this patent is extended or adjusted under 35 U.S.C. 154(b) by 915 days.

(21) Appl. No.: 12/696,761

(22) Filed: Jan. 29, 2010

(65) Prior Publication Data

US 2011/0188420 A1 Aug. 4, 2011

(51) Int. Cl.
*G08C 17/00* (2006.01)
*H04W 8/00* (2009.01)
*H04W 84/18* (2009.01)

(52) U.S. Cl.
CPC ............... *H04W 8/005* (2013.01); *H04W 84/18* (2013.01)
USPC .......................................................... 370/311

(58) Field of Classification Search
CPC .......................... H04W 84/18; H04W 52/0219
USPC .......................................................... 370/311
See application file for complete search history.

(56) References Cited

U.S. PATENT DOCUMENTS

| | | | | |
|---|---|---|---|---|
| 6,850,502 B1 * | 2/2005 | Kagan et al. | ............... | 370/330 |
| 8,077,712 B2 * | 12/2011 | Evans | ............... | 370/389 |
| 8,180,385 B2 * | 5/2012 | Aaron et al. | ............... | 455/509 |
| 2007/0208841 A1 * | 9/2007 | Barone et al. | ............... | 709/223 |
| 2008/0057872 A1 * | 3/2008 | McFarland et al. | ............... | 455/66.1 |
| 2008/0057976 A1 * | 3/2008 | Rae et al. | ............... | 455/456.1 |
| 2009/0010178 A1 * | 1/2009 | Tekippe | ............... | 370/254 |
| 2009/0022078 A1 * | 1/2009 | Patterson et al. | ............... | 370/311 |
| 2009/0052429 A1 * | 2/2009 | Pratt et al. | ............... | 370/350 |
| 2009/0059843 A1 * | 3/2009 | Binding et al. | ............... | 370/328 |
| 2009/0073942 A1 * | 3/2009 | Qin et al. | ............... | 370/338 |
| 2009/0092069 A1 * | 4/2009 | Rhee | ............... | 370/311 |
| 2009/0168703 A1 * | 7/2009 | Pandey et al. | ............... | 370/329 |
| 2009/0290572 A1 * | 11/2009 | Gonia et al. | ............... | 370/350 |
| 2009/0295546 A1 * | 12/2009 | Ha et al. | ............... | 340/10.33 |
| 2010/0074173 A1 * | 3/2010 | Ewing | ............... | 370/328 |
| 2010/0081381 A1 * | 4/2010 | Rofougaran | ............... | 455/41.2 |
| 2010/0098102 A1 * | 4/2010 | Banks et al. | ............... | 370/406 |
| 2010/0124209 A1 * | 5/2010 | In et al. | ............... | 370/337 |
| 2010/0124240 A1 * | 5/2010 | Lu et al. | ............... | 370/503 |
| 2010/0271974 A1 * | 10/2010 | Byard | ............... | 370/254 |
| 2011/0145381 A1 * | 6/2011 | Saint-Hilaire | ............... | 709/223 |
| 2011/0164531 A1 * | 7/2011 | Monnerie | ............... | 370/254 |
| 2011/0169654 A1 * | 7/2011 | Ketari | ............... | 340/687 |

OTHER PUBLICATIONS

European Patent Office, "Office Action", "from Foreign Counterpart of U.S. Appl. No. 12/696,761", Jun. 27, 2013, pp. 1-5, Published in: EP.

(Continued)

*Primary Examiner* — Brandon Renner
*Assistant Examiner* — Faisal Choudhury
(74) *Attorney, Agent, or Firm* — Fogg & Powers LLC

(57) ABSTRACT

A set sleep period is coordinated among a plurality of mesh network nodes to conserve power. A neighbor wireless mesh network node in proximity to a second node to be added to the mesh network is actuated, causing the neighbor wireless mesh network to be woke from a sleep state. The second node is added to the wireless mesh network by exchanging data with the neighbor wireless mesh network node to join the network.

17 Claims, 3 Drawing Sheets

(56) References Cited

OTHER PUBLICATIONS

European Patent Office, "Summons to Attent Oral Proceedings in EP Application No. 11705315.7 mailed Nov. 25, 2014", "from Foreign Counterpart of U.S. Appl. No. 12/696,761", Nov. 25, 2014, pp. 1-8, Published in: EP.

Choong et al., "Commissioning a wireless sensor and control system", "retrieved Dec. 29, 2014 from http://industrial.embedded-computing.com/pdfs/Daintree.Fall07.pdf", Sep. 1, 2007, pp. 1-6.

* cited by examiner

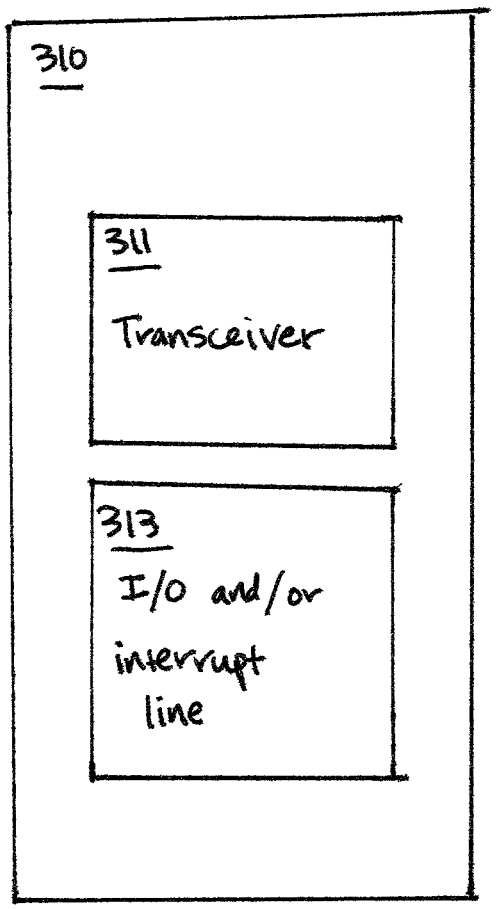

I/O DRIVEN NODE COMMISSIONING IN A SLEEPING MESH NETWORK

FIELD OF THE INVENTION

The invention relates generally to mesh networks, and more specifically in one embodiment to interrupt drive commissioning of nodes in a sleeping mesh network.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

BACKGROUND

Although computer networks have become relatively common both in office and in home networking environments, such networks are typically fairly sophisticated and require significant processing power, electrical power, and infrastructure to work well. Some networking applications do not require so robust a network environment, but can benefit from the ability to provide electronic communications between devices.

One such example is the Bluetooth technology that enables a cell phone user to associate and use an earpiece in what is sometimes referred to as a personal area network or PAN. Another example is a mesh network, in which a number of devices work together to form a mesh, such that data can be sent from a source device to a destination device via other devices in the mesh network.

Mesh networks often include multiple links from a network node to other network nodes nearby, and can thereby provide routing around broken links or paths by discovering other routes through the mesh to a destination node. New nodes to a mesh network are typically able to automatically discover the mesh network when they are activated in the vicinity of a compatible mesh network, and can easily join the network.

But, joining a mesh network becomes somewhat more complex in network environments where different frequencies or network identifiers are used. In ZigBee mesh networks, for example, different frequencies or channels can be used for different networks, such as to prevent nodes from one network from interfering with another network. A new node wishing to join a network must therefore find the appropriate frequency or channel being used by the intended network before it can join the intended network. This is performed in one example by searching among the various available channels until a mesh network is found, but confirming that the node has joined the intended network is difficult.

In addition to searching various frequencies or channels, some wireless mesh network technologies also sleep, or become inactive, to conserve power. For example, an array of battery powered sensors might be configured to wake up once every two hours and take a measurement, report the measurement via the mesh network, and go back to sleep. Use of sleeping nodes typically includes allowing end devices with reduced functionality to sleep, such as between taking and reporting measurements via router nodes that do not sleep. In other embodiments sleep times are synchronized between nodes in the network during configuration, so that all nodes are awake and able to contribute to mesh network communication at the same time.

But, in environments where mesh network nodes sleep for extended periods of time, it becomes difficult to add new nodes to the network or perform certain other node or network operations. There exists a need to provide wireless mesh network technology that addresses management of a mesh network with sleeping nodes.

SUMMARY

Some example embodiments of the invention comprise a mesh network of nodes having a set sleep period coordinated among the nodes to conserve power. A neighbor wireless mesh network node in proximity to a second node to be added to the mesh network is actuated, causing the neighbor wireless mesh network to be woke from a sleep state. The second node is added to the wireless mesh network by exchanging data with the neighbor wireless mesh network node to join the network.

BRIEF DESCRIPTION OF THE FIGURES

FIG. 3 is a high level block diagram of one embodiment of an exemplary wireless mesh network node.

DETAILED DESCRIPTION

Figure 1:
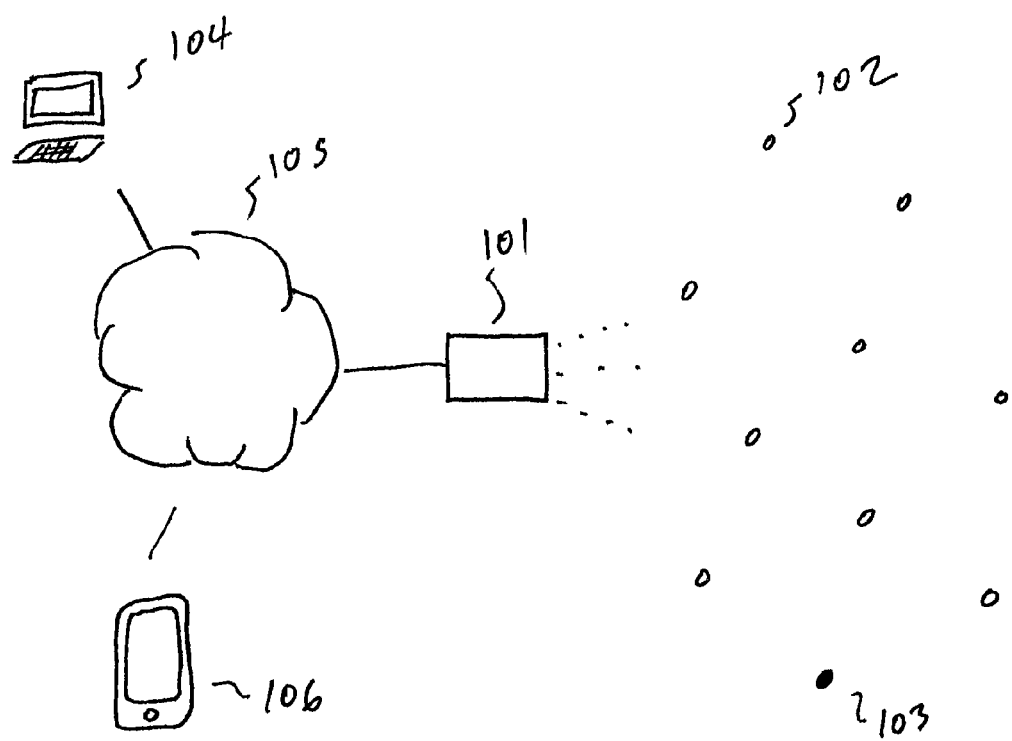
FIG. 1 shows an example wireless mesh network environment, consistent with an example embodiment of the invention.

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

Mesh networks are often used to route data between various elements or nodes in a network made up of a number of loosely assembled nodes. Many mesh networks are designed such that a compatible node can easily join the network and receive and send data, including passing received data along a route to an intended destination node. Mesh networks are therefore often self-healing, in that if a node becomes inoperable or loses a connection to another node, data can be easily routed around the broken network link.

Many mesh network technologies use wireless communication, further enhancing the ease of use of mesh networking for certain applications. Because mesh network nodes are typically stationary, wireless connections between various nodes can be formed and characterized by searching a known frequency or radio band for other mesh network nodes as new wireless nodes are added to the mesh network. Recent reductions in cost and advancement in wireless networking technology has made use of mesh networking for a variety of applications a desirable alternative to using a more structured network such as a TCP/IP network.

One example of a mesh network standard using wireless radio communication is the ZigBee mesh network, which was developed by an industry alliance and is related to IEEE standards including 802.15.4. The retail price of ZigBee-compliant transceivers is nearly a dollar, and a transceiver, memory, and processor can be bought for a few dollars in quantity, making integration of mesh network technology into inexpensive electronic devices economically practical. The standard is intended to support low power consumption at reasonably low data rates, and provides a self-organizing network technology that works well for applications such as control, monitoring, sensing, and home automation.

In this example of wireless mesh technology, one node operates as a coordinator, forming the root of the mesh network and performing other functions such as bridging to other networks and handling encryption keys. Most nodes are router nodes, which can receive and send data, including passing data along to other nodes. In some embodiments, end device nodes contain just enough functionality to receive and send data, but cannot route or pass data from a sending node to a different receiving node. While this preserves battery life and reduces the cost of the node, end device nodes are unable to contribute to the routing functions of the mesh network, and so will typically not make up a large percentage of a mesh network's nodes.

Nodes in some mesh networks can also conserve power by entering a sleep mode, or becoming inactive for extended periods of time when operation is not necessary. For example, a mesh network of ground moisture sensors may only need to take and report measurements every two hours, and need only be awake for a few milliseconds every two hour period. The sleeping nodes in a further embodiment of such a network are desirably synchronized during configuration of the network so that they wake at the same time, enabling the nodes to communicate with each other while awake and route data from neighboring nodes.

New nodes are typically able to join an existing network by searching known radio channels on which the mesh network technology operates, and in further examples by looking for other mesh network nodes broadcasting data having a PAN ID that matches the PAN ID of the network that the new node wishes to join. But, this becomes more difficult if the other nodes in the network are asleep, and if it is unknown when or for how long the nodes will be awake. Further, the sleep timing of the network can be several hours or longer as illustrated by the previous example, which is likely longer than an installer will be willing to wait to install a new node or perform other network functions such as replacing or reconfiguring a node.

This is solved in some embodiments by leaving at least one node powered, such as the coordinator node of the mesh network. The new node can join the network and synchronize its sleep schedule from the coordinator node, and will link to neighboring nodes in the mesh once placed in the mesh during the next wake cycle. Another option is to have all nodes in the mesh network remain awake after a certain wake cycle, so that the nodes remain awake while the installer works. This requires planning the service before the preceding wake period, and requires that all nodes remain on for an extended period of time which may significantly impact battery life. A third option includes powering on a new node in range of the sleeping network and keeping it fully awake until the rest of the network wakes up and the nodes can exchange synchronization information. This technique has the disadvantage that the newly added node can deplete a significant portion of its batteries in the time it waits to join the network.

Some embodiments of the invention improve upon prior methods by providing one or more nodes that can be woken during the coordinated sleep period, such as by toggling an I/O or interrupt line to wake a network node near the node being serviced. For example, a failed mesh network node can be replaced by removing the failed node, powering on a replacement node, and toggling an interrupt line by actuating a switch on a neighboring node such that the neighboring node wakes up for a predetermined amount of time. This enables the neighboring node to communicate with the replacement node, exchanging information such as the PAN ID, encryption keys, sleep timing, and other information to incorporate the new node into the mesh network.

FIG. 1 illustrates an example mesh network environment, such as may be used to practice some embodiments of the invention. A mesh network gateway or controller device 101 in this example includes a mesh network radio such that it is operable to communicate with mesh network nodes 102, and a network connection such that it is operable to bridge the mesh network to an external network 105. The mesh network nodes 102 are distributed about an area within radio contact of one another, such as security monitoring devices within a store or warehouse, water monitoring devices distributed about a golf course or farm, or military surveillance devices distributed about a hostile area. One of the mesh network devices 103 is undergoing a service operation, such as being newly installed or replacing a failed mesh network device.

The gateway device 101 bridges the wireless mesh network to the Internet 105, which couples the mesh network to various devices such as a computer system 104 that is operable to access and control the mesh network. A mobile wireless device 106 such as an Internet-enabled cell phone can also be used to configure and control the mesh network, enabling control of the mesh network nodes from remote locations such as locations within the mesh network.

Figure 2:
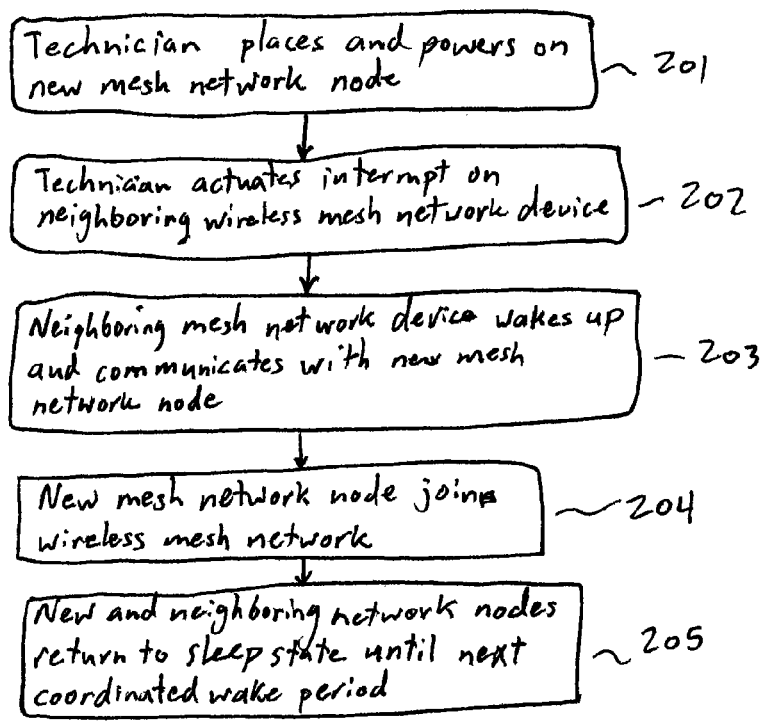
FIG. 2 is a flowchart illustrating a method of actuating a neighboring node to add a node to a wireless mesh network, consistent with an example embodiment of the invention.

FIG. 2 is a flowchart of a method of adding new devices to a sleeping mesh network, consistent with an example embodiment of the invention. In this example, a gateway controller such as 101 of FIG. 1 is powered by an external power connection, but the mesh network nodes 102 are battery powered and sleep for extended periods coordinated between nodes. The nodes all wake at the same time, so that information can be communicated throughout the network, passed between neighboring nodes until the information reaches its desired destination. Because the wake period is in many embodiments only several milliseconds long and occurring every several hours, performing maintenance functions such as adding a new mesh network node during the brief period when the network is awake will often require waiting for hours until the next wake period.

Here, a node 103 has failed and is being replaced with a new node that has no knowledge of the mesh network or its coordinated sleep schedule. Although the network node is within communication distance of several other network nodes, it is not within communication distance with the gateway device 101, which is the only device in the network that does not sleep to conserve battery power.

To perform the service operation, a service technician first removes the failed mesh network device, and places and powers on a new mesh network node device at 201. The technician then actuates a neighboring mesh network node located near the new node, such as by triggering an interrupt or performing another monitored I/O function operable to wake up the sleeping neighbor node at 202. The actuation can take place using a separate device such as an attached service or configuration device, by pushing a button or other actuation of a part of the node device, or any other such function. In an alternate embodiment, steps 201 and 202 are performed in opposite order, such that the new mesh network device is powered on after the neighboring network node is actuated.

The neighboring mesh network node wakes as a result of the actuation, and becomes operable to communicate with other devices such as the new network node device at 203. The new mesh network node joins the wireless mesh network by exchanging network configuration information with the awake neighboring node, including information such as adding the replacement node to the neighboring node's node list, and sending network identification information and sleep timing data from the neighboring node to the new mesh network node device.

This results in the new network node device joining the network at 204, after which the new and neighboring network nodes return to their sleep states at 205 until the next coordinated wake period. The new device in a further example provides an indication that it has successfully communicated with the neighboring node and joined the network, such as by flashing an indicator light.

These examples illustrate how actuation of a sleeping mesh network node can be used to awaken the node, enabling installation of new or replacement nodes into the mesh network without waiting until the next scheduled time the entire network is awake. This facilitates faster configuration and service of new network node devices, enabling service operations to be performed at any time. It also provides significantly improved power savings and battery life over prior solutions requiring the entire mesh network to be left in a powered on state for long periods of time to perform service functions.

FIG. 3 is a high level block diagram 300 illustrating an example wireless mesh network node 310. Wireless mesh network node 310 includes a transceiver 311, such as discussed above. Wireless mesh network node 310 also includes I/O and/or interrupt line 313, such as discussed above.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the example embodiments of the invention described herein. It is intended that this invention be limited only by the claims, and the full scope of equivalents thereof.

What is claimed is:

1. A method of operating a wireless mesh network, comprising:

individually actuating a neighbor wireless mesh network node in proximity to a second node to be added to the mesh network, causing the neighbor wireless mesh network to be woke from a synchronized sleep state prior to a scheduled synchronized wake period of a sleep schedule, wherein the actuation is selective of the neighbor wireless mesh network node actuated; and adding the second node to the wireless mesh network, the second node exchanging data, including the sleep schedule, with the neighbor wireless mesh network node to join the network;

wherein, after the second node joins the network, the second node and the neighbor wireless mesh network node return to a sleep state until a next scheduled synchronized wake period according to the sleep schedule;

wherein the sleep schedule coordinates sleep periods and synchronized wake periods such that the neighbor wireless mesh network node, the second node, and one or more other wireless mesh network nodes are awake at the same time.

2. The method of operating a wireless mesh network of claim 1, wherein actuating the neighbor wireless mesh network node comprises at least one of sending an interrupt, sending an I/O signal, and sending a network signal to the neighbor wireless mesh network node.

3. The method of operating a wireless mesh network of claim 1, wherein the sleep state comprises an extended state of inactivity lasting longer than five minutes, configured to preserve battery life in the neighbor wireless mesh network node.

4. The method of operating a wireless mesh network of claim 1, further comprising returning at least one of the neighbor wireless mesh network node and the second node to a coordinated sleep state once the second node has joined the network.

5. The method of operating a wireless mesh network of claim 1, wherein the second node is further operable to indicate it has successfully joined the network.

6. The method of operating a wireless mesh network of claim 1, wherein exchanging data comprises exchanging one or more of network ID, sleep period, and neighboring node data.

7. A wireless mesh network, comprising:

a plurality of wireless mesh network nodes having a synchronized sleep state to conserve power, at least one of the plurality of wireless mesh network nodes operable to wake from the synchronized sleep state prior to a scheduled synchronized wake period of a sleep schedule upon individual actuation and to join a new or replacement second node to the mesh network by exchanging data, including the sleep schedule, with the new or replacement second node, wherein the actuation is selective of a single wireless mesh network node of the plurality of wireless mesh network nodes;

wherein, after the new or replacement second node joins the mesh network, the at least one wireless mesh network node and the new or replacement second node are configured to enter a sleep state until a next scheduled synchronized wake period according to the sleep schedule;

wherein the sleep schedule coordinates sleep periods and synchronized wake periods such that the at least one wireless mesh network node, the new or replacement node, and the other wireless mesh network nodes of the plurality of wireless mesh network nodes are awake at the same time.

8. The wireless mesh network of claim 7, wherein actuating the wireless mesh network node comprises at least one of sending an interrupt, sending an I/O signal, and sending a network signal to the neighbor wireless mesh network node.

9. The wireless mesh network of claim 7, wherein the synchronized sleep state comprises an extended state of inactivity lasting longer than five minutes, configured to preserve battery life in the neighbor wireless mesh network node.

10. The wireless mesh network of claim 7, at least one of the nodes operable to wake and the new or replacement second node operable to return to a synchronized sleep state once the second node has joined the network.

11. The wireless mesh network of claim 7, wherein the new or replacement second node is further operable to indicate it has successfully joined the network.

12. The wireless mesh network of claim 7, wherein exchanging data comprises exchanging one or more of network ID, sleep period, and neighboring node data.

13. A wireless mesh network node comprising:
a transceiver configured to transmit and receive data when the wireless mesh network node is in an awake state;
at least one of an input/output (I/O) or an interrupt line;
the wireless mesh network node having a sleep state synchronized with a plurality of other mesh network nodes to conserve power, the wireless mesh network node operable to wake from the synchronized sleep state prior to a scheduled synchronized wake period of a sleep schedule upon individual actuation and to add a new or replacement second node to the mesh network by exchanging data, including the sleep schedule, with the new or replacement second node, wherein the actuation is selective of the wireless mesh network node actuated;
wherein, after the new or replacement second node is added to the mesh network, the at least one wireless mesh network node and the new or replacement second node are configured to enter a sleep state until a next scheduled synchronized wake period according to the sleep schedule;
wherein the individual actuation includes a state change on the I/O or interrupt line;
wherein the sleep schedule coordinates sleep periods and synchronized wake periods such that the wireless mesh network node, the new or replacement node, and the plurality of other wireless mesh network nodes are awake at the same time.

14. The wireless mesh network node of claim 13, wherein actuating the wireless mesh network node comprises at least one of sending an interrupt, sending an I/O signal, and sending a network signal to the neighbor wireless mesh network node.

15. The wireless mesh network node of claim 13, wherein the synchronized sleep state comprises an extended state of inactivity lasting longer than five minutes, configured to preserve battery life in the neighbor wireless mesh network node.

16. The wireless mesh network node of claim 13, the wireless mesh network node operable to return to a synchronized sleep state once the new or replacement second node has joined the network.

17. The wireless mesh network node of claim 13, wherein exchanging data comprises exchanging one or more of network ID, sleep period, and neighboring node data with the new or replacement second node.

* * * * *

UNITED STATES PATENT AND TRADEMARK OFFICE
CERTIFICATE OF CORRECTION

PATENT NO. : 8,982,754 B2
APPLICATION NO. : 12/696761
DATED : March 17, 2015
INVENTOR(S) : Filoso et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 938 days.

Signed and Sealed this
Twentieth Day of October, 2015

Michelle K. Lee
*Director of the United States Patent and Trademark Office*